United States Patent Office 3,426,909
Patented Feb. 11, 1969

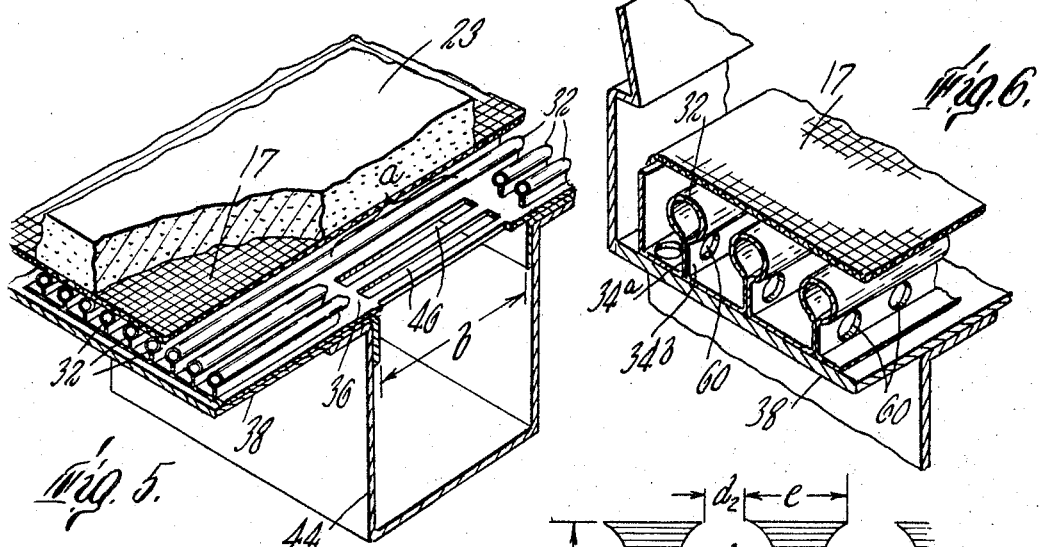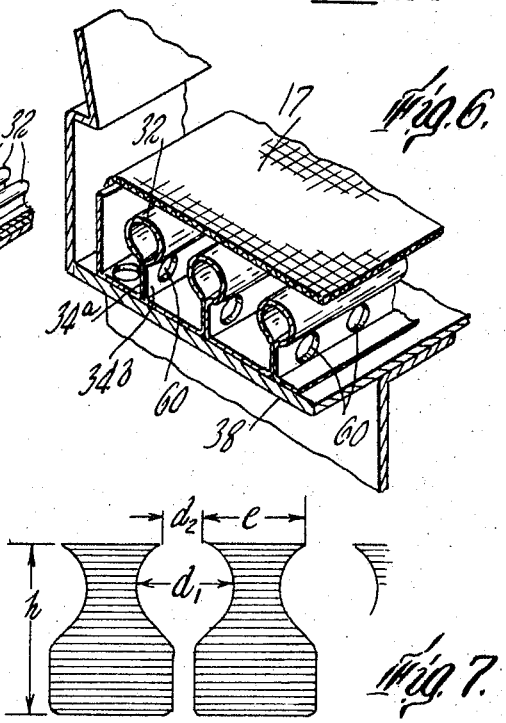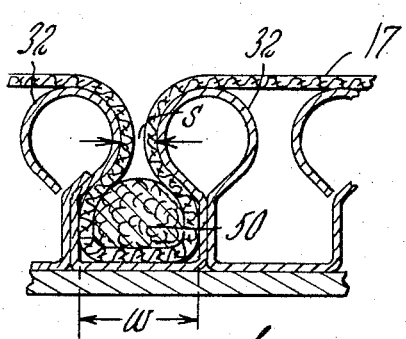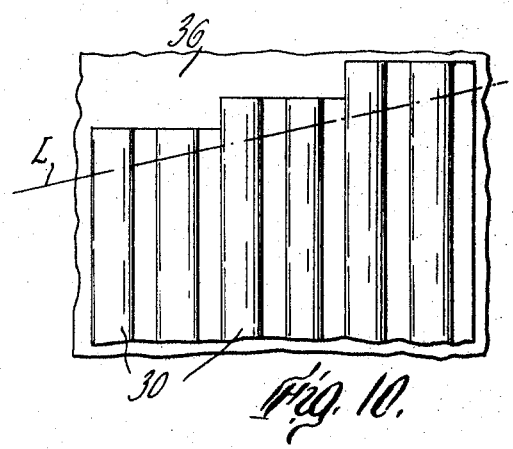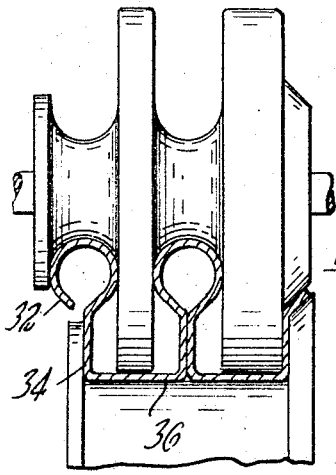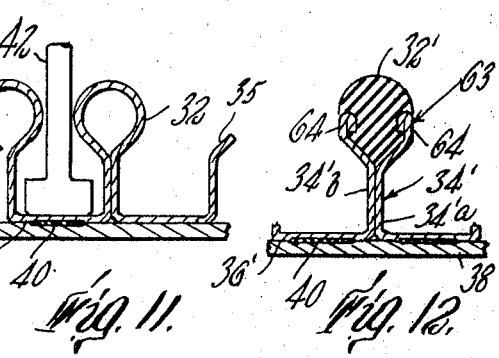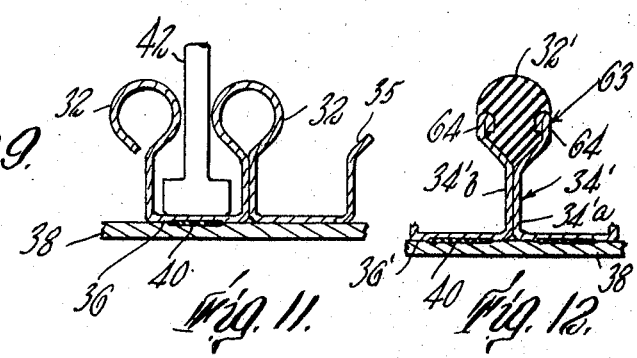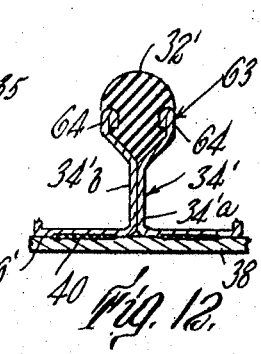

3,426,909
FILTER MEDIUM SUPPORT GRID
Edward Vernon Garner, East Walpole, Mass., assignor to Bird Machine Company, South Walpole, Mass., a corporation of Massachusetts
Filed July 20, 1965, Ser. No. 473,415
U.S. Cl. 210—474  7 Claims
Int. Cl. B01d 35/00

ABSTRACT OF THE DISCLOSURE

A filter medium support structure comprising a multiplicity of upstanding, elongated, closely spaced together elements, each element having a thin leg and an outwardly convex crest substantially wider than the leg and overhanging the space between legs of adjacent elements. Base sections connect adjacent elements, and the structure is formed of similar, integral sections interlocked together.

---

This invention relates to filtering devices in which a large expanse of filter medium is supported across its width and receives a usually heavy slurry of solids and liquid upon one side. In such filter devices, by virtue of differential pressure, e.g. as produced by gravity or suction, the liquid passes through the filter medium while the solids accumulate as a substantial mass of filter cake on the filter medium, from which they are periodically discharged as by dumping or scraping.

The invention has special relevance to horizontal pan filters for the removal of gypsum from phosphoric acid.

One object of the invention is to achieve, in such filter devices, an improved resolution of the conflicting demands for protection of filter medium from wear, large unobstructed area of filter medium, large flow cross-section for filtered liquid, durability, and low cost of the filter structure relative to its life and production rate.

Another object of the invention is to provide improved filter devices in which the filter medium support is simple to fabricate and assemble, cooperates with the filter medium to achieve long filter medium life and efficient liquid flow, and cooperates with the other elements to provide a strong, durable, and inexpensive structure.

A particular object of the invention is to provide improved horizontal pan filter devices of very large size.

Another particular object is to facilitate the manufacture of filter devices of various specific types, forms and shapes.

Another object of the invention is to provide filter devices having a modular support element, permitting a flexibility to the filter designer in the size, shape and type of filter while requiring the stocking of only one or a few different types of support elements, with the attendant advantages of large volume production and improved inventory control.

Another object of the invention is to provide an improved means of assembling a filter device.

Still another object is to provide at the same time with improved filter medium support, improvements in the securing of filter medium upon the support, especially in large expanses.

Still another object of the invention is to provide horizontal filter devices which are improved from the points of view of limiting the void space under the filter support grid and preventing liquid carry-over from one filtering or washing stage to the next.

Another object of the invention is to provide a filter medium support structure for a pan filter device which is readily adaptable to various modes and directions of pan drainage.

And still another object of the invention is to provide a filter support structure which enables provision for renewing the portion, subject to greatest wear, directly contacting the filter medium.

These and other objects, features and advantages inhere in the invention.

In one important aspect, the invention employs as a filter medium support a crest, preferably of enlarged or bulbous form, supported by a narrower leg, as a grid element. The grid is made up of a large multiplicity of these parallel upstanding grid elements, with the crests aligned with each other in filter medium supporting position. The filter medium rests directly upon the crests, extending thereover. The cross-sectional area between adjacent elements comprises the drain area for filtered liquid which can proceed parallel to the filter medium to a collector, the area between the legs being substantially wider than that between crests.

Advantageously, one, or preferably a small number of elements are formed integral with each other as a modular unit. In preferred forms of the invention at least the legs of the elements and the base flanges are formed together from a single originally flat sheet of metal, by cold rolling techniques. In a particularly preferred embodiment the bulbous heads are also formed by cold rolling the same sheet, but in another embodiment, as where wear is a serious problem, the head is formed as a removable element, interconnected with the upstanding leg.

The modular elements advantageously may be secured, as by face-to-face welding of the base flange, to a supporting base surface, and the entire assembly may be cut to the desired overall shape.

Essential to the operation of the invention, and basic to the concept, is the realization that in the combination of a filter device, such form of elements, especially when sized and arranged within certain limits, achieves the objects set out above.

Other aspects of the invention, and a clearer understanding of the aspects just mentioned will now be explained in the detailed description, in connection with the drawings of a pan filter assembly, taken to illustrate the invention, wherein.

Figure 1:
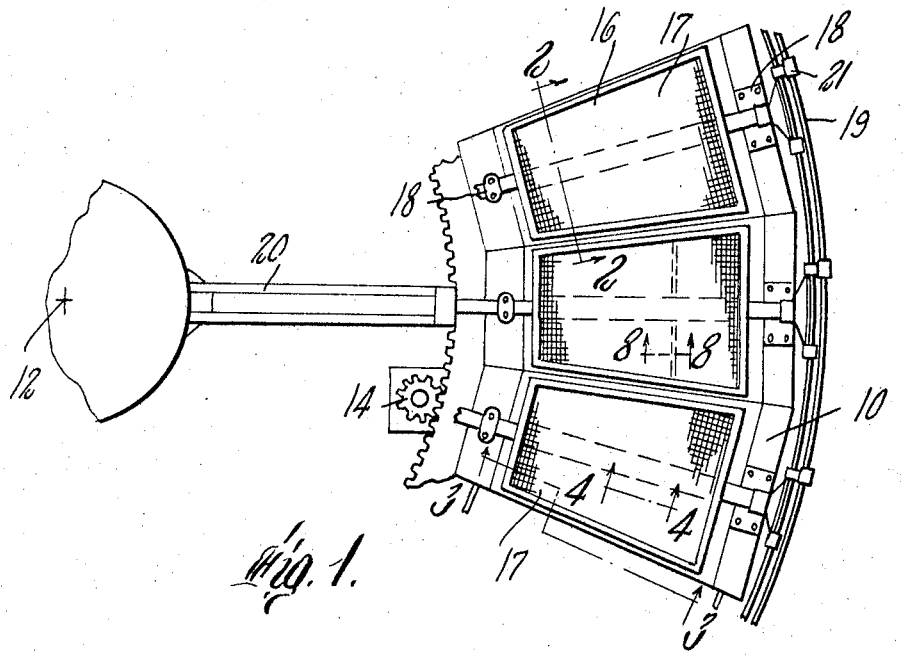
FIG. 1 is a plan view of part of a pan filter assembly of overall known design, employing the invention.
Figure 4:
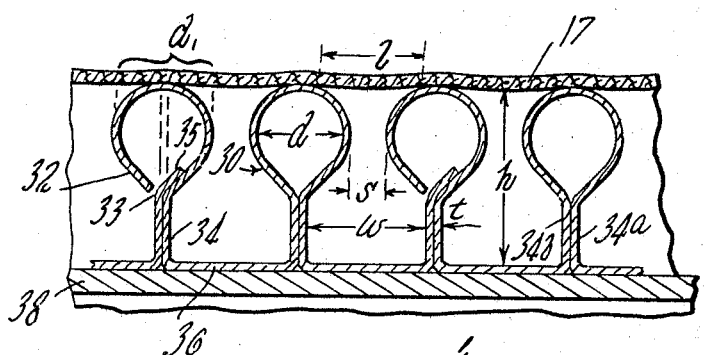

FIG. 4 similarly is a longitudinal vertical cross-sectional view, but on a considerably larger scale, taken on line 4—4;

FIG. 5 is a partially broken away perspective view of the pan of FIG. 1, illustrating the support, drain and outlet features of the support;

FIG. 6 is a vertical cross-section illustrating features similar to FIG. 5 of an alternative embodiment;

FIG. 7 is a diagram illustrating the hydraulic flow cross-section for the liquid drain between elements;

FIG. 8 is a transverse cross-section of the filter pan of FIG. 1, taken on line 8—8 illustrating the ability of the support structure to accommodate filter medium caulking, as desired on large size pans;

FIG. 9 is an illustration of a step in a cold-rolling procedure for producing the modular element of the invention combination;

FIG. 10 is a plan view illustrating a step in the assembly of the filter pan of FIG. 1;

FIG. 11 is a vertical cross-sectional view illustrating another step in the assembly of FIG. 1;

FIG. 12 is a vertical cross-sectional view of another embodiment of the invention having a renewable head feature.

Referring to FIG. 1 there is shown a portion of a tiltable pan type filter, this being specifically like that illustrated in the Delruelle Patent No. Re. 24,150 and in the U.S. Patent No. 3,216,576 of John Roos.

The filter comprises a horizontal circular frame 10 rotated about axis 12 by gear 14. On this frame are mounted a plurality of filter cells or pans 16, rotatably mounted by bearings 18 on the frame 10 to tilt under the control of cam path 19 and cams 21 about a generally radial axis. In this particular embodiment suction lines 20 are provided to produce a vacuum in the cell below the filter medium 17 which extends horizontally over the cell in the filtering position shown.

As is well known, at one point along the rotary travel of the frame 10 each cell receives a charge of solid and liquid slurry. After initial drainage of the liquid through the filter medium 17, the solid cake is subjected to repeated washings, the liquid at these stages also passing through the filter medium, though valved to different locations due to the increased dilution of the liquid. When washing is completed the filter pan 16 is inverted under the control of the cam track 19, the solids cake being dumped into a receptacle, not shown, the filter medium is cleansed, and the cycle repeated.

Referring to FIGS. 2–5, according to the invention the filter medium 17, which may be suitable cloth and/or wire, is supported by close-together bulbous heads 32 of a plurality of side-by-side, parallel grid elements 30 forming the filter medium support. The bulbous heads 32, of maximum horizontal extent $d$ and effective supporting crest area $d_1$, are supported by legs 34 of a much lesser horizontal extent or thickness $t$.

Referring to FIG. 5 filtered liquid proceeds in the channels defined by adjacent elements 30, generally parallel to the filter medium 17, to a collector, in this embodiment central collector 44. Referring to FIG. 7 it will be noted that although the supporting crests $d_1$ for the filter medium can be of large curvature, providing optimal wear conditions for the filter medium, and although adjacent bulbous portions are very close together, with little space $s$ between, still the flow cross-section area is very substantial and has a width, for a considerable fraction of its height, substantially the distance between centers of the grid elements. Accordingly, suustantially more than one-half of the total space defined between the filter medium and the bottom of the channel is available for flow. Furthermore the close element spacing limits filter medium droop between elements and the open area of the filter medium, unblocked by the support elements, is substantially greater than 50% (compare dimension 1 with dimension $d_2$) despite the large curvature and extent $d_1$ of the crests. The medium contacts, at any one time, only a small portion of the total curvature of the crests, the full curvature serving to prevent wear when the cloth shifts as it does from time to time during operation.

The result of the foregoing arrangement is efficient use of filter medium along with high drainage rate, achieved in a compact structure. From an operational as well as weight of material standpoint it becomes feasible to make extremely large pans, or other filter devices.

This possibility of large pans is further enhanced because the unique form of support element has extremely good structural properties, the bulbous ends of the elements in effect forming flanges, and the legs forming webs, which strengthen the pan bottoms.

Advantageously, the grid elements are provided with base flanges or sections 36, and the legs 34 and the base flanges 36 are formed integrally by cold rolling a single sheet of metal, thus minimizing curvature at the point of juncture of leg and flange and enabling the base flanges 36 to be flat and lie face to face with the base surface, e.g. base panel 38 of the filter device, to which they are joined.

Advantageously, the bulbous edges of the elements are also formed integrally with the other portions by cold rolling, see the diagram FIG. 9 of the final rolling stage, thus providing an economical means of mass-producing the modular element, and further providing a means of optimally shaping the element despite the use of a very heavy gauge metal sheet, e.g. 19 gauge (.044 inch thick) as is desired for providing a durable corrosion resistant wear surface engaged with the filter medium.

As illustrated it is advantageous that two grid elements be formed together as one modular element, with the tubular or bulbous edge 32 of one element being open at 33 at its base, and the next element having an outer leg section 35 shaped for insertion therein, to join the two together.

In an alternative embodiment, instead of having the inclined upper leg section 35, as is desired for ease of insertion, the leg section could be straight and extend into contact with the top of the crest as indicated by dotted lines in FIG. 4, thus giving even that crest two leg sections for support, similar to the two leg sections 34a, 34b which support an intermediate crest.

Referring to FIGS. 11 and 12 the face-to-face mating of the base flanges 36, 36' of the cold rolled form with the base panel 38 permits the formation of a very strong weld 40 by insertion of a welding probe 42 between adjacent elements.

Referring again to FIG. 5, the special form of the elements is especially of advantage in the outlet area. In this embodiment a longitudinal opening of width $b$ is formed in the bottom panel 38 of the pan, in line with the suction piping 20, and a collector channel 44 is secured beneath it. Openings 46 are formed in the base flanges 36 of the grid elements in line with opening $b$, the legs 34 and bulbous portions 32 being undisturbed, extending across the full width of the opening as indicated at $a$ in FIG. 5, the closest elements to the reader being shown broken away for purposes of illustration only. Thus the filter medium 17 and its load of filter cake 23 are properly supported in the outlet area by the grid elements, while simultaneously these elements contribute substantial strength and stiffening to the filter pan. In this respect also the special form of the grid elements contribute to the feasibility of extremely large filter pans, e.g. pans of 16 feet length and 55 square feet area of filter medium are possible despite a long opening of width $b$ in the panel bottom.

Still another feature of the invention, also of great importance for large filter areas, as illustrated in FIG. 8. The overhang of each of the bulbous portions (or the overhang of one only, if each bulbous portion should extend to only one side of its leg) provide an elongated pocket having a narrow upper neck $s$. By use of a resilient caulking strip 50, e.g. rope or rubber, pressed downwardly with the filter medium 17 through the neck into the pocket of width $w$, a means is provided, at all points over the filter medium as needed, to secure the filter medium to the pan.

Not only is this means of caulking simple and inexpensive to provide. It has the desirable feature of leaving the filter medium working surface unobstructed, enabling cleaning by water spray, with no difficult-to-clean projections or crevices.

The possibility of caulking at any point permits the filter designer to adopt as large a pan size as desired, without fear of over-tensioning the filter medium. (With tilt filter pans the filter medium is subject to tension when discharging filter cake, and inverting the pan for washing. Tension problems are also encountered when solid cakes are removed from filter medium by scraping.)

Even with an extra large filter pan, the continuous filter medium is readily divided, by appropriate caulking strips, into smaller spans. Thus the catenary tension upon inversion of the pan can even be reduced from that encountered with conventional sizes and designs of filter pans, and the filter medium life accordingly lengthened.

Referring to FIG. 6, the face-together nature of the two leg sections 34a, 34b of each leg 34 permit the formation of side drain holes 60, as is desired when the corner drain technique is employed (see Delruelle Patent Re. 24,150, FIG. 5).

A small spacing can however be left between the two leg sections, to provide a degree of widthwise resiliency, for use during assembly as decribed below.

The face-together arrangement also eliminates voids beneath the filter medium at the level of the filtered liquid. Hence the carry-over difficulties encountered with other filter grids, which caused the undesired dilution of filtrate by carry-over from mother liquor to wash stations, is avoided.

Figures 2, 3:
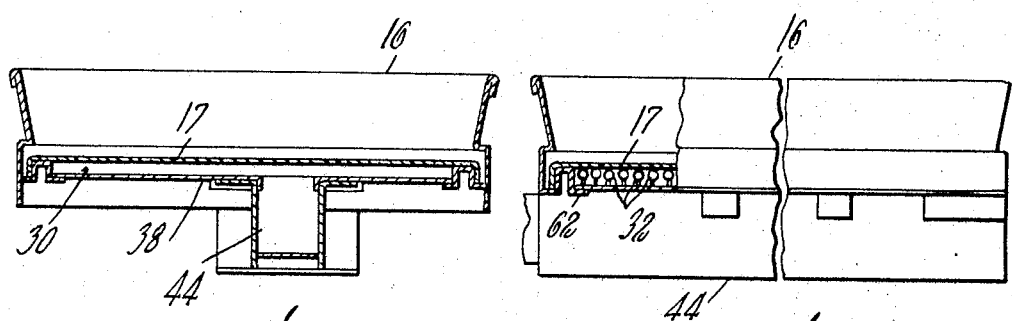
FIG. 2 is a transverse vertical cross-section of one of the filter pans of FIG. 1, taken on line 2—2.
FIG. 3 is a longitudinal vertical cross-section of the pan, taken on lines 3—3 of FIG. 1.

Another feature of the inveintion is the simple manner in which a filter pan may be assembled. Referring to FIG. 10, first a multiplicity of grid elements may be interconnected, placed upon base panel 36. Where an angled shape is desired, as indicated by line L, appropriate lengths of the modular elements can be laid up. The elements can be squeezed together widthwise, the shape inherently providing widthwise resiliency, so that it is always possible to place an even number of elements within a given dimension widthwise. In place, the elements are then welded, per FIG. 11, then the base panel 36 and elements together may be cut along line L, to the desired shape. Referring to FIG. 3, the thus completed bottom is laid upon flange 62 of the preformed pan sides and welded in place, thus completing the pan.

Referring to the embodiment of FIG. 12, there is shown a removable head 32', mounted on legs 34'. This head might be rubber or other resilient, durable material, or for conditions of extreme corrosion, by taking advantage of the inherent springiness of the legs 34', the head may be of corrosion resistant metal, e.g., stainless or Monel, having oppositely directed side slots 63 interlocked with opposed projections 64 carried by the two spring leg sections 34'a, 34'b.

With regard to the separation of gypsum from phosphoric acid and the like, it is presently found necessary to have the size of the various features within certain limits. The center-to-center spacing of the legs of adjacent grid elements should be on the order of 1 inch or less, and the crests engaging the filter medium should be curved with a radius of curvature on the order of ½ inch or less.

Advantageously the center-to-center spacing of the legs is about ½, the crests are curved with a radius of curvature of about ⅛ inch and the depth of the flow cross-section is about ½ inch. Advantageously the entire grid element, including the crest, is roll formed from corrosion resistant metal of a thickness in excess of at least .020 inch.

Advantageously, as shown, a grid element of the invention comprises a base section forming the bottom of the flow cross-section, at one side of the element, a leg section integral therewith, extending outwardly at a substantial angle, preferably perpendicular thereto, and a curved crest section integral with the leg and presenting an outwardly directed crest, presenting a smooth surface for contact with the filter medium.

Variations in the specific details of the invention, within the scope and spirit of the claims will occur to those skilled in the art.

I claim:

1. In a filter structure comprising a grid, a filter medium supported on said grid, said grid defining longitudinal channels through which filtered liquid can flow for a substantial distance parallel to said filter medium with each channel discharging into a collector, said grid being defined by a multiplicity of elongated elements each having a rounded filter medium support crest, the improvement wherein the grid defines only a single set of channels to which all liquid flowing through said filter medium is confined, each channel being defined on its sides by spaced apart thin sheet metal legs, a wider, rounded filter medium support crest disposed along the top portion of each leg and integral therewith, the crest comprising a generally hollow tubular formation, adjacent crests being spaced apart to provide horizontally elongated open-downward paths for liquid from said filter medium to said single set of channels, the elements forming each channel with a wider flow area in its lower region than the spacing between adjacent crests.

2. The filter structure of claim 1 wherein the legs of given elements are each defined by a pair of upstanding leg sections, the top of each leg section being integral with a respective portion of said tubular crest formation.

3. The filter structure of claim 1 wherein a caulking member is disposed between two of said legs securing said filter medium therebetween, said caulking member being restrained from outward movement by at least one of said crest of one of said two legs.

4. The filter structure of claim 1 comprising a tilting pan cell, said pan having a generally planar bottom panel, adjacent legs of said grid being joined together by a common bottom portion which forms the bottom of the channel defined by said elements, said bottom portions secured face-to-face to the bottom panel of said pan.

5. A tilting pan cell for a filter comprising a generally planar metal panel, a grid supported on said panel, and a filter medium supported on said grid, said grid defining longitudinal channels through which filtered liquid can flow for a substantial distance parallel to said filter medium with each channel discharging into a collector, said grid being defined by a multiplicity of parallel elongated elements each having a rounded filter medium support crest, the improvement wherein the grid defines only a single set of channels to which all liquid flowing through said filter medium is confined, each channel being defined on its sides by metal legs, each leg extending upwardly substantially at a right angle to the upper surface of said planar panel, each said support crest being wider than its respective leg and joined to the top thereof, and a base portion integral with the bottom of each said leg and extending laterally therefrom substantially parallel to the upper surface of said panel and welded face-to-face thereto, adjacent crests being spaced apart to provide horizontally elongated open-downward paths for liquid from said filter medium to said single set of channels, the elements forming each channel with a wider flow area in its lower region than the spacing between adjacent crests.

6. The filter structure of claim 5 including means for removably securing a discrete crest member to each of said legs, whereby said crest members can be removed without disturbing other portions of said grid.

7. The filter structure of claim 5 wherein each said support crest is integral with its leg, each said crest being shaped to present a smooth surface to filter medium for contact therewith throughout the filter cycle, said elements formed of abrasion resistant metal of a thickness in excess of at least .020 inch.

References Cited

UNITED STATES PATENTS

| | | | |
|---|---|---|---|
| Re 24,150 | 5/1956 | Delruelle | 210—203 |
| 2,285,894 | 6/1942 | Brooks | 210—404 |
| 2,998,883 | 9/1961 | Rich | 210—404 |
| 3,134,733 | 5/1964 | Rose | 209—393 |
| 3,216,576 | 11/1965 | Roos | 210—328 |
| 3,225,935 | 12/1965 | Porteous | 210—404 |
| 3,300,052 | 1/1967 | Steintveit | 210—402 |

SAMIH N. ZAHARNA, *Primary Examiner.*

W. S. BRADBURY, *Assistant Examiner.*

U.S. Cl. X.R.

210—328, 344